(12) United States Patent
Fujiwara et al.

(10) Patent No.: US 6,538,970 B1
(45) Date of Patent: Mar. 25, 2003

(54) DISK DEVICE FOR LOADING AND EJECTING DISKS

(75) Inventors: Tatsunori Fujiwara, Tokyo (JP); Takao Morimoto, Tokyo (JP); Masao Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/685,035

(22) Filed: Oct. 10, 2000

Related U.S. Application Data

(63) Continuation of application No. PCT/JP99/00596, filed on Feb. 12, 1999.

(51) Int. Cl.⁷ .............................................. G11B 33/02
(52) U.S. Cl. ...................................................... 369/77.1
(58) Field of Search ............................... 369/75.1, 75.2, 369/77.1, 77.2

(56) References Cited

U.S. PATENT DOCUMENTS

| | | | | |
|---|---|---|---|---|
| 5,299,185 A | * | 3/1994 | Sakurai et al. | 369/75.2 |
| 5,301,176 A | * | 4/1994 | Kawachi et al. | 369/75.2 |
| 5,572,498 A | * | 11/1996 | Choi | 369/77.2 |
| 5,615,197 A | * | 3/1997 | Choi | 369/77.2 |
| 5,737,293 A | * | 4/1998 | Kawamura et al. | 369/77.1 |
| 5,867,338 A | * | 2/1999 | Ohira et al. | 369/75.2 |
| 5,963,527 A | * | 10/1999 | Hiraga | 369/75.2 |
| 6,314,073 B2 | * | 11/2001 | Horie | 369/77.2 |

FOREIGN PATENT DOCUMENTS

| | | |
|---|---|---|
| JP | A7201113 | 8/1995 |
| JP | A8167212 | 6/1996 |
| JP | A8180537 | 7/1996 |

* cited by examiner

*Primary Examiner*—David Davis
(74) *Attorney, Agent, or Firm*—Birch, Stewart, Kolasch & Birch, LLP

(57) ABSTRACT

A disk device is comprised of a CD conveying mechanism which performs the uptake and ejection of CDs by a conveying roller 11. An MD conveying mechanism drives a clamp lever rotating mechanism which performs the refuge of the clamp lever 17 from an initial position and the return of the clamp lever 17 to an initial position by being driven by a CD loading drive motor. A CD is clamped by a clamp mechanism when the CD is loaded onto a fixed position in the device and directed to a turntable. When an MD 24 is loaded or ejected, the MD conveying mechanism drives the refuge or return of the clamp lever 17. The placement of an MD 24 on a turntable is performed by an MD placing mechanism which is driven as a result of an MD 24 being taken up to a fixed position in the device.

2 Claims, 21 Drawing Sheets

DISK DEVICE FOR LOADING AND EJECTING DISKS

CROSS-REFERENCE TO THE RELATED APPLICATION

This Application is a continuation of International Application No. PCT/JP99/00596, whose International filing date is Feb. 12, 1999, the disclosures of which Application are incorporated by reference herein.

BACKGROUND OF THE INVENTION

1. Field of the Invention

The present invention relates to a disk device which can load information recording media of different types, such as a circular disk used as a single disk and a cartridge-stored disk used in the cartridge-stored state, on a turntable of a playing unit (floating deck) and eject the information recording media from the turntable.

2. Description of the Related Art

A conventional disk device, in particular those disk devices which are adapted for the mutual use of a circular disk used as a single disk (hereafter CD) and a cartridge-stored disk used in the cartridge stored state (hereafter MD), entail the necessity of providing a CD/MD loading motor separately to a clamp motor.

Since the conventional disk device is constructed as above, at least two motors, one for CD/MD loading and another for clamping are necessary. Thus manufacturing costs rise along with an increase in the number of components. Also reliability suffers due to the number of motors.

SUMMARY OF THE INVENTION

The present invention is proposed to solve the above problems and has the object of providing a disk device which can avoid reductions in reliability associated with motor trouble and reduce costs. The disk device of the present invention can be used with information storage media such as a circular disk used as a single disk or a cartridge-stored disk used in a cartridge-stored state. The conveying and clamping of the circular disk or the cartridge-stored disk is performed by a single drive motor.

The disk device of the present invention comprises a single drive motor which is operated by the insertion of a circular or cartridge-stored disk, a CD conveying mechanism which performs the uptake and ejection of a circular disk into the device through a conveying roller which is operated by the motive force of a drive motor, a clamp mechanism which clamps a circular disk with a clamp lever which acts from an initial position towards the turntable when the circular disk is loaded to a fixed position in the device by the CD conveying mechanism conveying roller, a clamp lever rotation mechanism which rotates a clamp lever on the insertion of a cartridge disk to a position in which the uptake and ejection of a cartridge disk in the device will not be impeded, which when the cartridge disk is ejected, returns the clamp lever to an initial position and which is driven by the drive motor, and an MD conveying mechanism which is connected to said clamp lever mechanism by a link mechanism, which performs the conveying of the cartridge disk into the device together with the refuge of the clamp lever and which performs the ejection of the cartridge disk together with the return of the clamp lever to an initial position and an MD loading mechanism which loads a cartridge-stored disk on the turntable together with the uptake of a cartridge-stored disk to a fixed position in the device by the MD conveying mechanism.

In this way, it is possible to use a single drive motor as a source of motive power of each component mechanism both with respect to a circular disk and a cartridge-stored disk. Therefore, reductions in reliability as a result of plural motors can be avoided.

The disk device of the present invention is provided with a cam section which limits the downward rotation of the MD holder support member when the CD clamp is operating on the sliding plate of the clamp rotation mechanism.

By such an arrangement, it is possible to increase reliability by a simple structure which prevents abutment of the MD conveying mechanism and MD loading mechanism with the CD during CD playing.

DETAILED DESCRIPTION OF THE PREFERRED EMBODIMENTS

In order to explain the invention in greater detail, the preferred embodiments are outlined below with reference to the accompanying figures.

Embodiment 1

Figure 1:
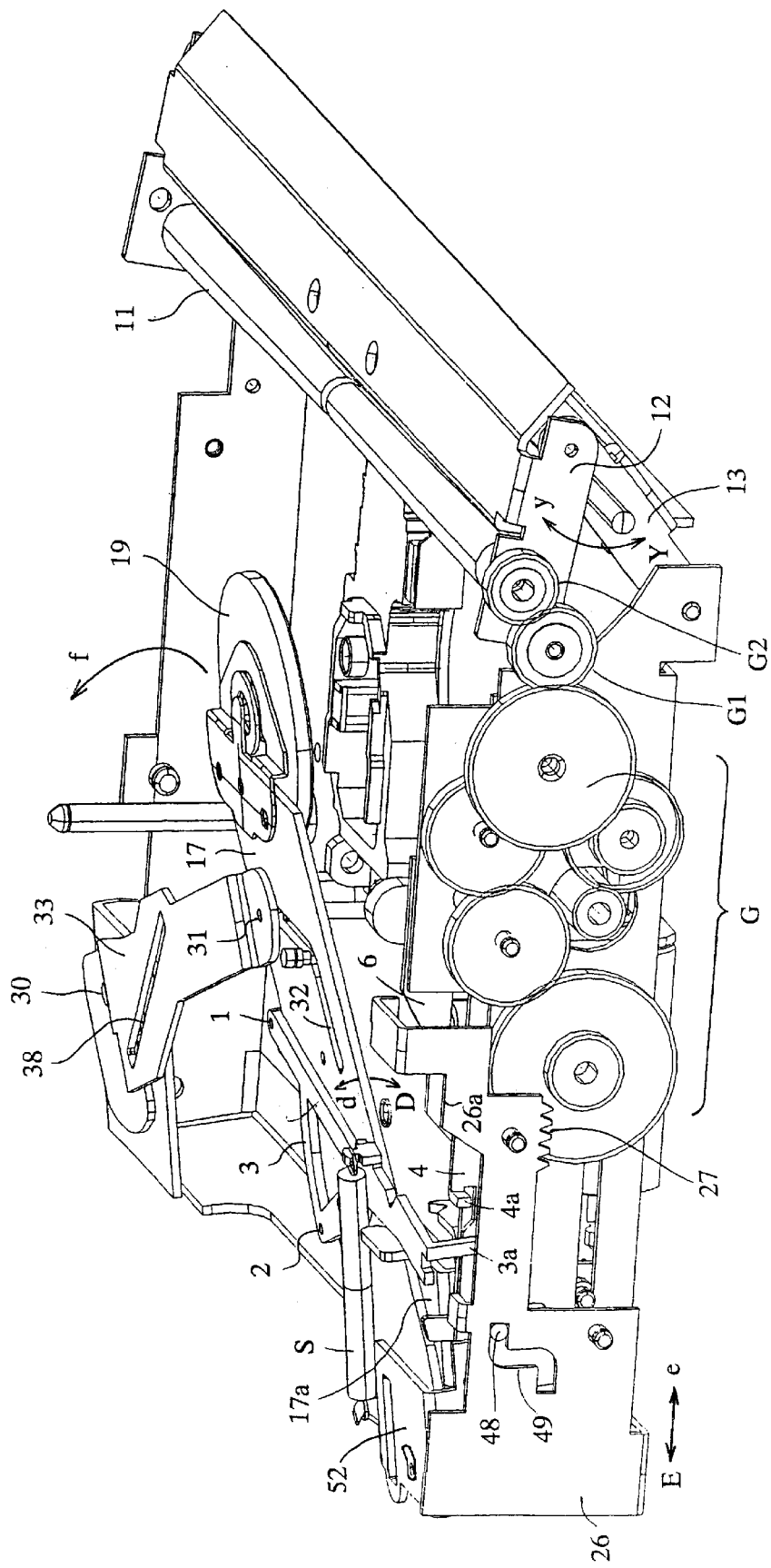
FIG. 1 is a three dimensional representation of a disk device according to a first embodiment of the present invention.
Figure 2:
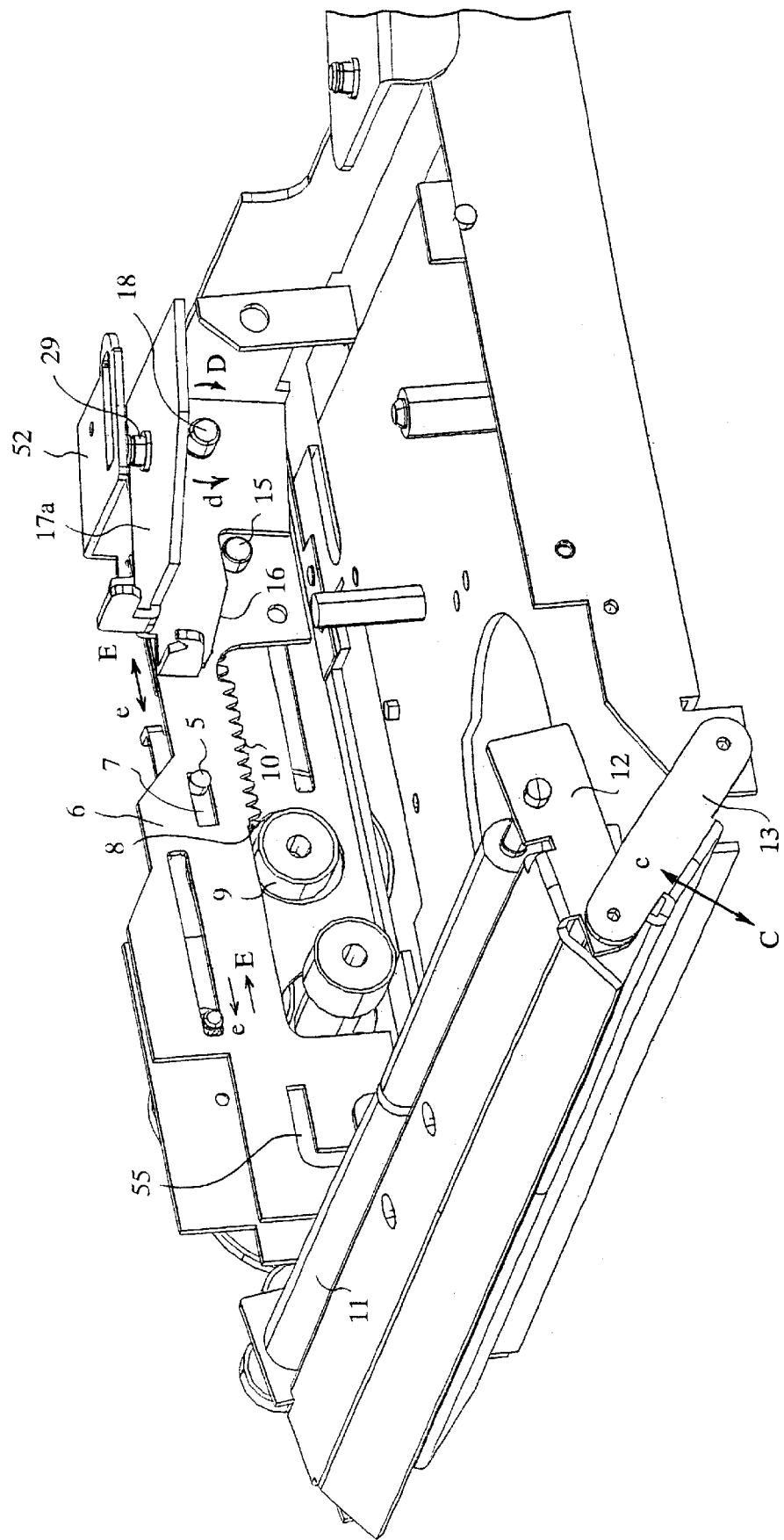
FIG. 2 shows a first embodiment of the disk device seen from a different perspective with internal components omitted.

FIG. 1 is a three dimensional representation of a disk device according to a first embodiment of the present invention. FIG. 2 shows a first embodiment of the disk device seen from a different perspective with internal components omitted. In the figures, reference numeral 1 denotes a small diameter disk abutting pin which abuts with the outer circumference of a small disk when the inserted disk is an 8 cm disk (hereafter small disk). 2 is a large diameter disk abutting pin which abuts with the outer circumference of a large disk when the inserted disk is a 12 cm disk (hereafter large disk).

3 is a lever which has a small diameter disk abutting pin 1 or large diameter disk abutting pin 2 and which is rotatable about a supporting point 3b (not shown), 3a is an engaging piece which is formed on one end of the lever 3.

4 is a first sliding plate formed by the engaging piece 4a and is formed so as to be slidable in the direction E and e of the arrow. A rack 8 is formed on the first sliding plate 4 as shown in FIG. 2 and is adapted to engage with a gear 9 when it slides in the direction e. Furthermore a pin 5 as shown in FIG. 2 is formed on the first sliding plate 4 and engages with the slit 7 of the second sliding plate 6.

6 is a second sliding plate which is adapted to be slidable in the direction E and e of the arrow. A rack 10 is formed on the second sliding plate 6 as shown in FIG. 2 and is adapted to engage with a gear 9 when it slides in the direction e. Furthermore a pin 15, a pin 21 (not shown), a slit 7 and an S-shaped elongated hole 55 are formed on the second sliding plate 6.

The symbol G in FIG. 1 denotes a gear unit, 11 is a conveying roller. The conveying roller 11 transmits the rotations of a drive motor (not shown) through a gear unit G and is adapted to rotate bi-directionally in response to the insertion or ejection of small diameter disks, large diameter disks or mini-disks (hereafter MD). As a result, a gear G2 is fixed to one end of the shaft of the conveying roller 11 and the gear G2 engages with a gear G1 formed on the gear unit G.

12 is a conveying roller support lever which supports the conveying roller 11 so as to be rotatable at both ends. The conveying roller support lever 12 is axially supported in free rotation by shared use of the rotation shaft of the gear G1 which is formed on the gear unit G.

Figure 7:
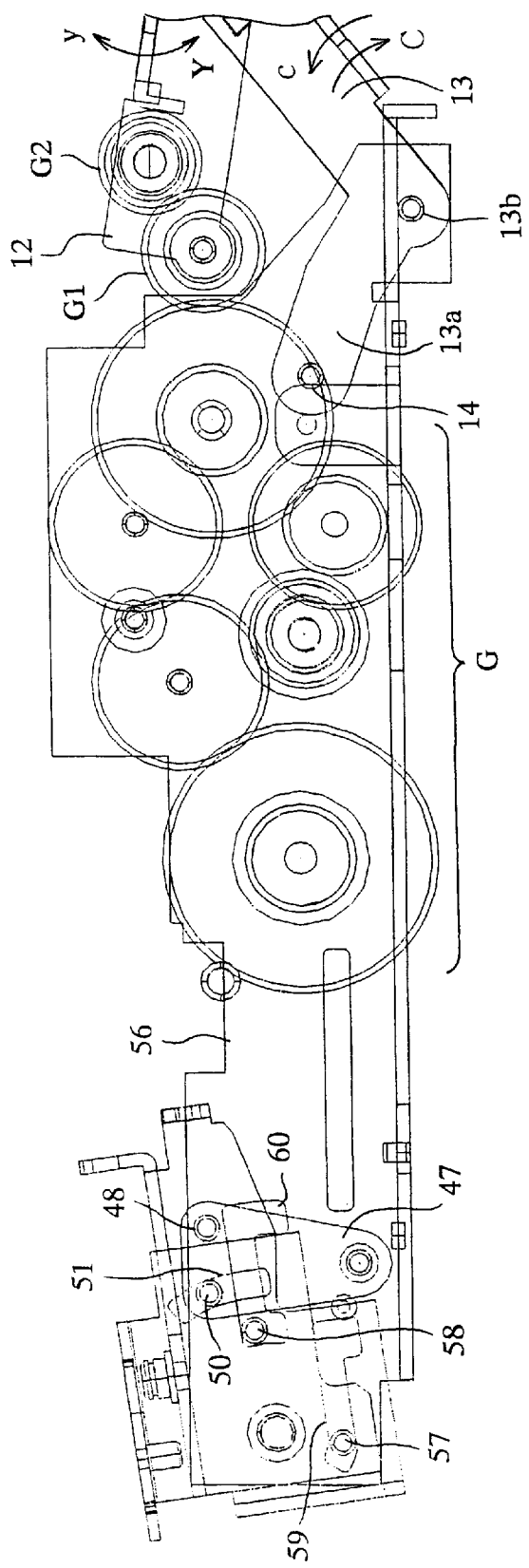
FIG. 7 is a lateral view of a disk device according to a first embodiment of the present invention.

13 is a lifting arm which rotates the conveying roller support lever 12 in the directions Y and y in order to raise and depress the conveying roller 12. The lifting arm 13 has an L-shaped extension 13a which comprises a pin 14 as shown in FIG. 7 and is adapted to rotate in the directions C and c about the shaft 13b. The pin 14 on the extension section 13a engages with the S-shaped elongated hole 55 on the second sliding plate 6 as shown in FIG. 2.

17 is a clamp lever which is provided on the tip of the clamp 19. The clamp lever 17 is adapted to rotate in the direction f and an L-shaped elongated hole 32 is formed on the clamp lever 17.

17a is a clamp lever supporting member which is provided with a rotating shaft 29 shown in FIG. 2 for supporting the clamp lever 17 so as to be rotated in the direction f. The clamp lever supporting member 17a is adapted to rotate in the directions D and d about the rotation shaft 18 as shown in FIG. 2. A cam face 16 which engages with a pin 15 is formed on the clamp lever supporting member 17a.

26 is a third sliding plate. An S-shaped elongated hole 49 and a rack 27 are formed on the third sliding plate 26 and are adapted to slide in the directions E and e of the arrow.

33 is a link lever formed on the elongated hole 38 which is adapted to be rotated about a shaft 30 which acts as a center of rotation. A pin 31 which engages with the L-shaped elongated hole 32 of the clamp lever 17 is formed on the tip of the link lever 33.

Figure 3:
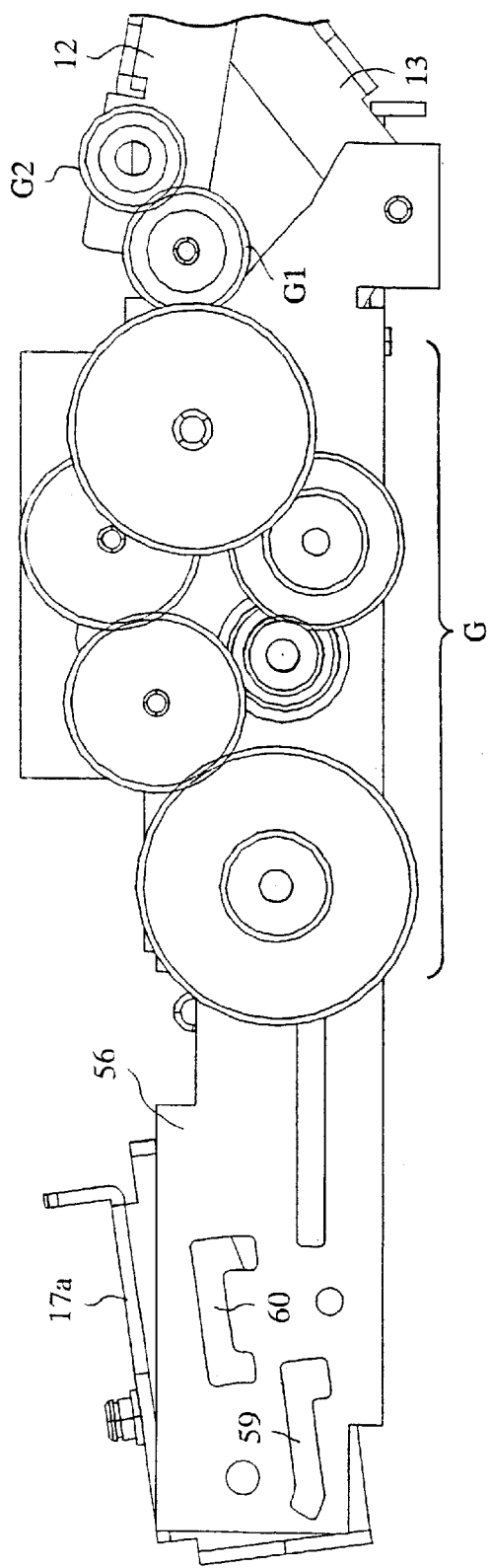
FIG. 3 is a lateral view of a disk device according to a first embodiment of the present invention seen from the gear unit with a third sliding plate removed.

FIG. 3 is a lateral view seen from the unit gear G of a disk device in FIG. 1 with the third sliding plate 26 removed. In the figure, the relay member 47 has been omitted as well. In the figure, 56 is a fixing plate of the gear unit G or the like and 59 and 60 are elongated holes.

Figure 4:
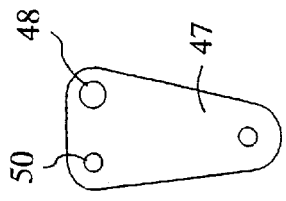
FIG. 4 is a component view showing a relay member in a disk device according to a first embodiment of the present invention.

The reference numeral 48 in FIG. 1 is a pin formed on the relay member 47 shown in FIG. 4 and which engages with an S-shaped elongated hole 49.

Figure 5:
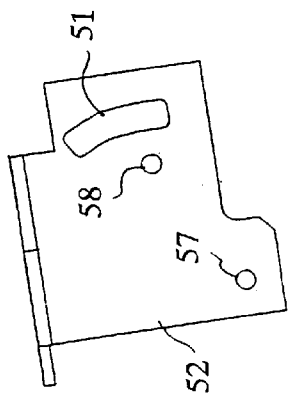
FIG. 5 is a component view showing an intermediate member in a disk device according to a first embodiment of the present invention.

52 is an intermediate member shown in FIG. 5 and on which pins 57, 58 and an arc-shaped elongated hole 51 are formed.

Figure 6:
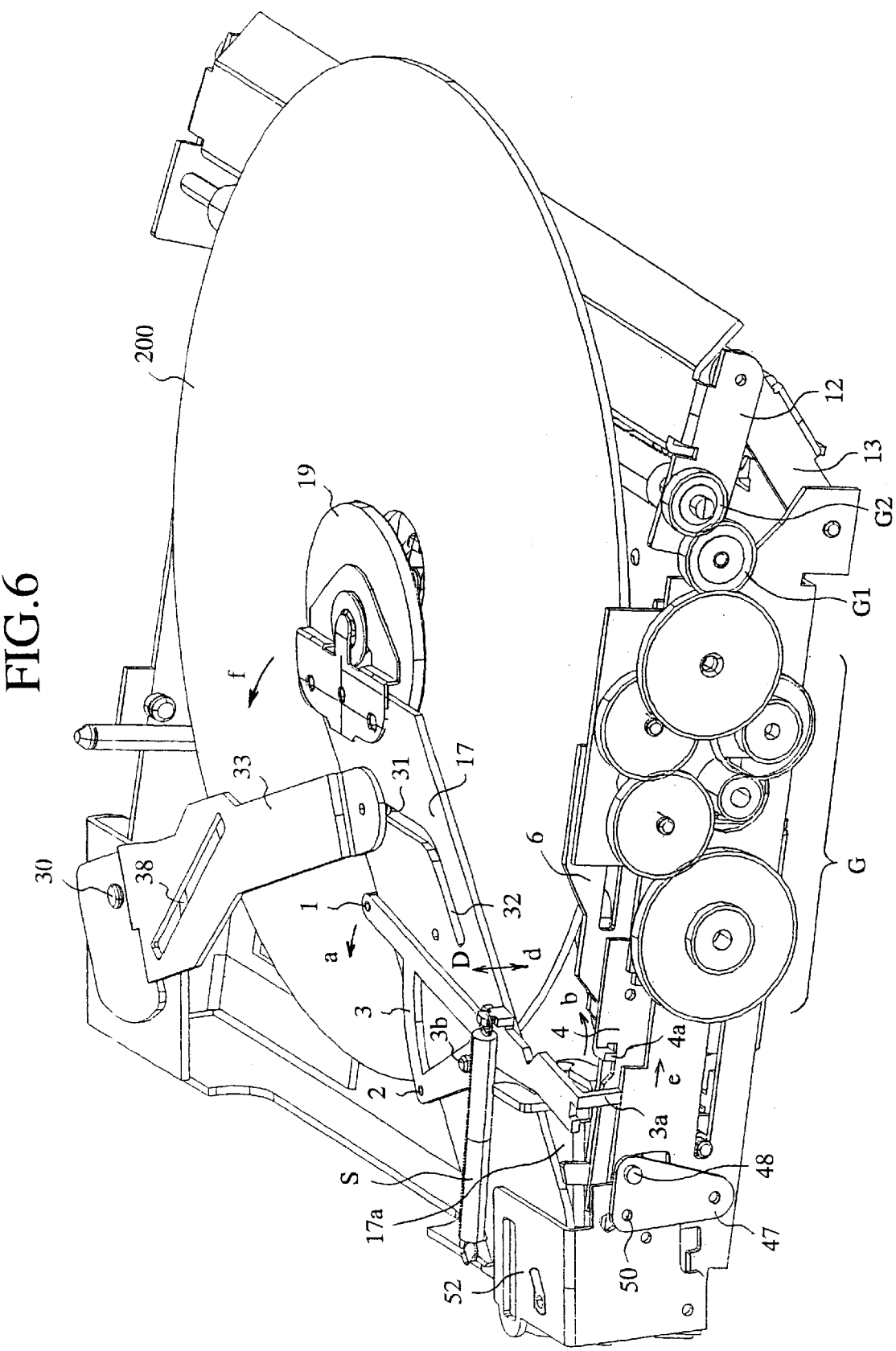
FIG. 6 is a three dimensional representation of the disk device according to a first embodiment of the present invention when a large diameter disk is inserted.

FIG. 6 is a three dimensional representation of the disk device according to the first embodiment when a large diameter disk is inserted. In FIG. 6, the same or similar components to those in FIG. 1 are represented by the same reference numerals and their explanation will be omitted. The third sliding plate 26 shown in FIG. 1 is omitted from FIG. 6 so as to clearly represent the relay member 47 which is disposed on the rear side of the third sliding plate 26. In the figure, 200 is a large diameter disk, and S is a spring which compresses the tip, by which a small diameter disk abutting pin 1 of the lever 1, is formed, in the clockwise direction about the supporting point 3*b*.

FIG. 7 is a lateral figure which shows the structure of a disk device according to a first embodiment.

Figure 8:
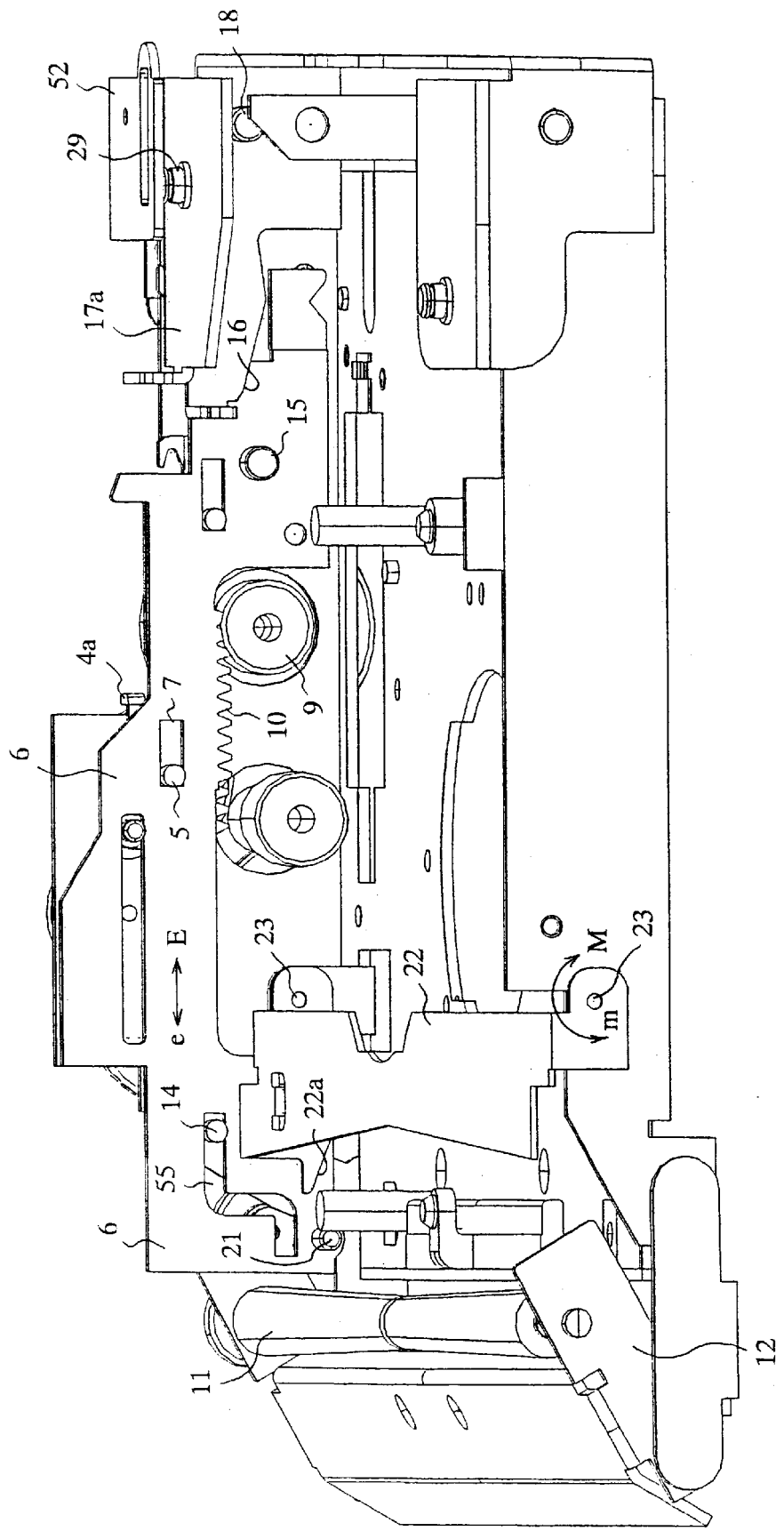
FIG. 8 is a three dimensional representation of the mechanism by which the conveying roller is prevented from projecting into abutting contact with the edge of a small diameter disk in a disk device according to a first embodiment of the present invention.

FIG. 8 is a three dimensional representation of the mechanism by which the conveying roller 11 is prevented from abutting with the edge of a small diameter disk by raising the peripheral section of the small disk on the conveying roller abutting side upwardly when the conveying roller 11 abuts with the rear face of the small disk and conveys the small disk. In the figure, 21 is a pin which is provided on the second sliding plate 6. 22 is a CD raising lever. A cam face 22*a* is formed on the CD raising lever 22. The CD raising lever 22 is adapted to rotate about the shaft 23 in the directions M and m the pin 21 abuts with the cam face 22*a*.

Figure 9:
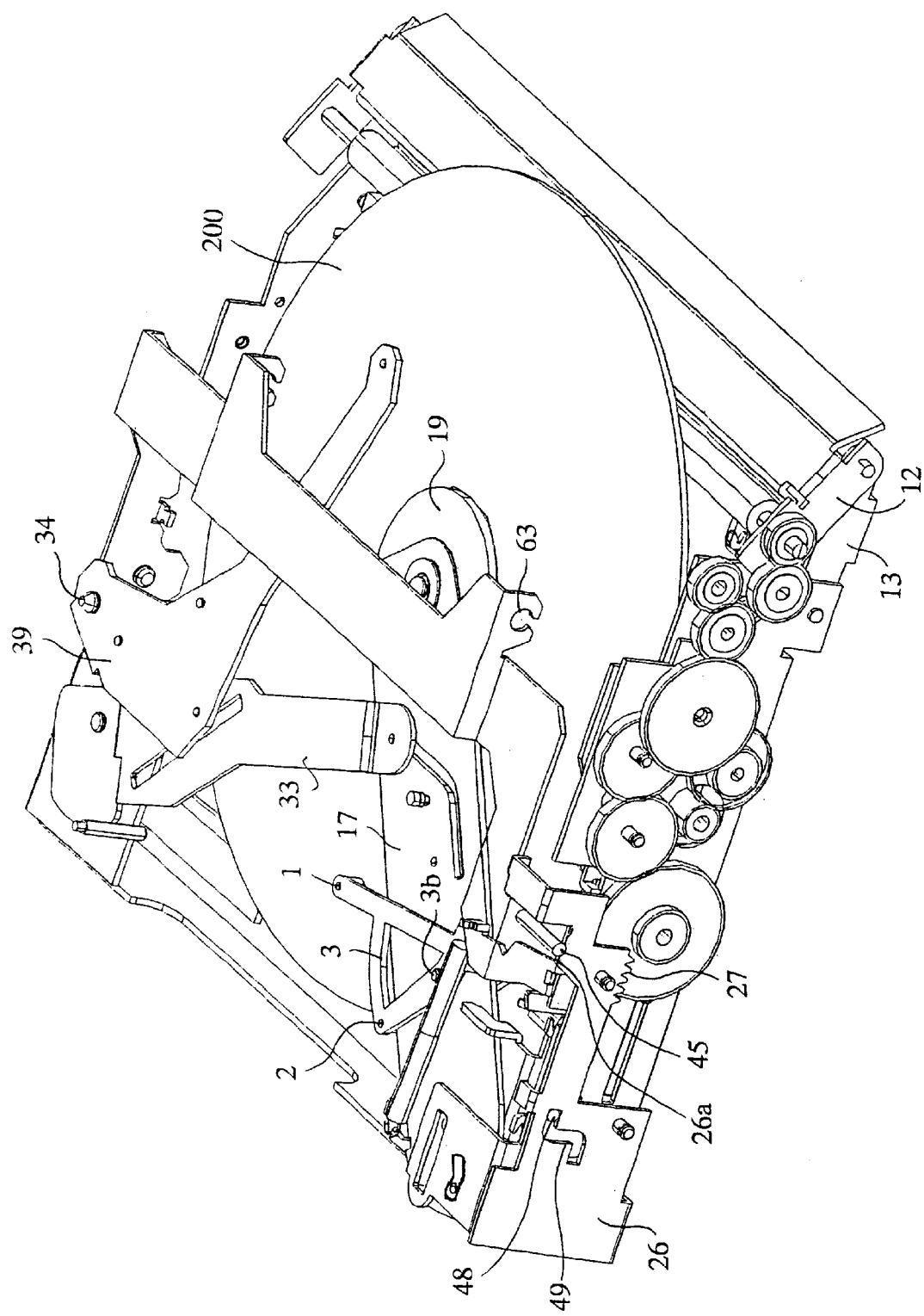
FIG. 9 is a three dimensional representation of the mechanism by which the center of a large diameter disk is conveyed onto a turntable and the downward rotation of an MD holder support member is limited in a disk device according to a first embodiment of the present invention.

FIG. 9 is a three dimensional representation of the mechanism by which the center of a CD (large diameter disk) 200 is conveyed onto a turntable in a disk device according to a first embodiment of the present invention.

Figure 10:
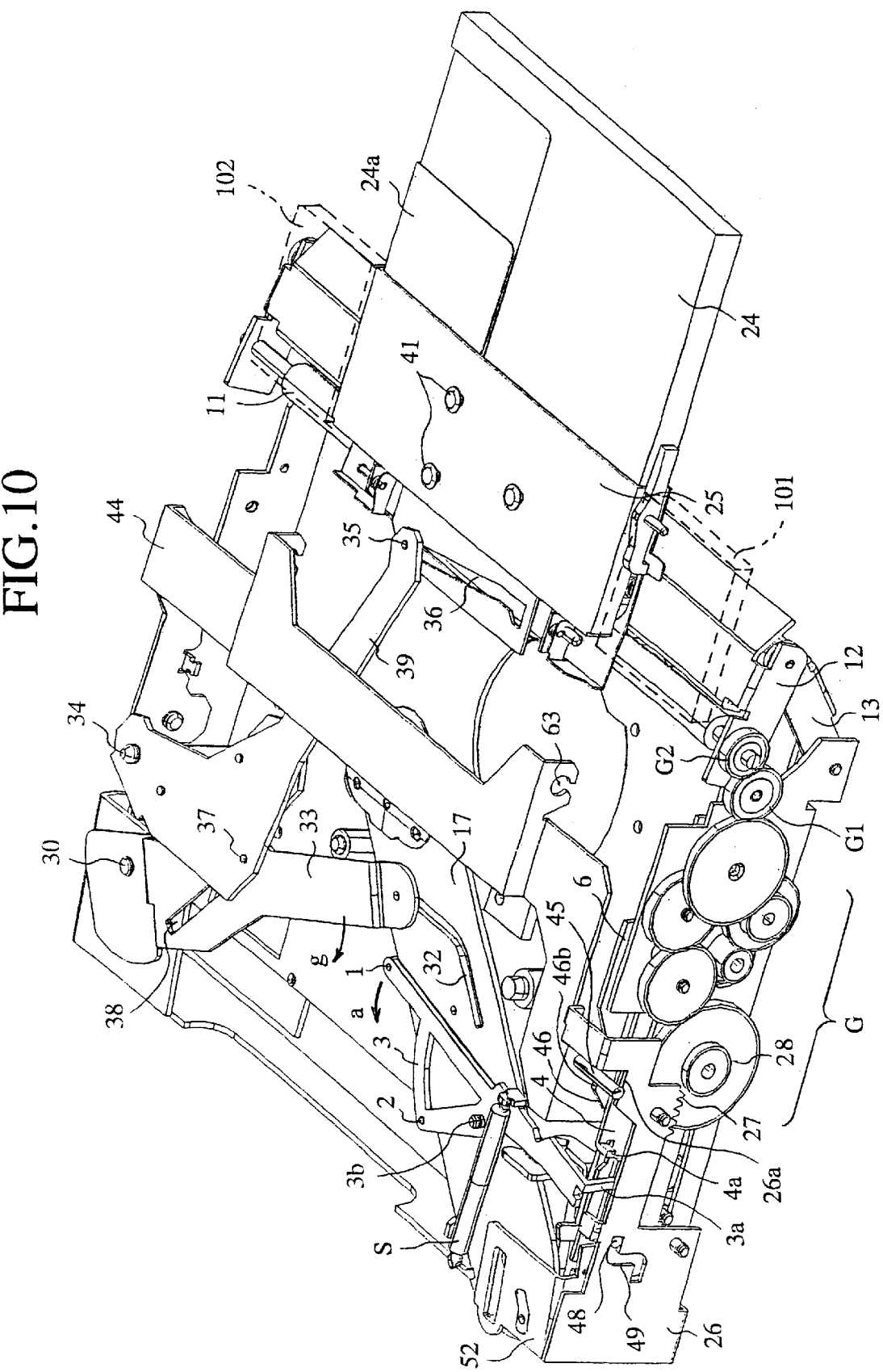
FIG. 10 is a three dimensional representation of the mechanism of a disk device to which a member which functions when an MD is loaded has been added in a disk device according to a first embodiment of the present invention.
Figure 13:
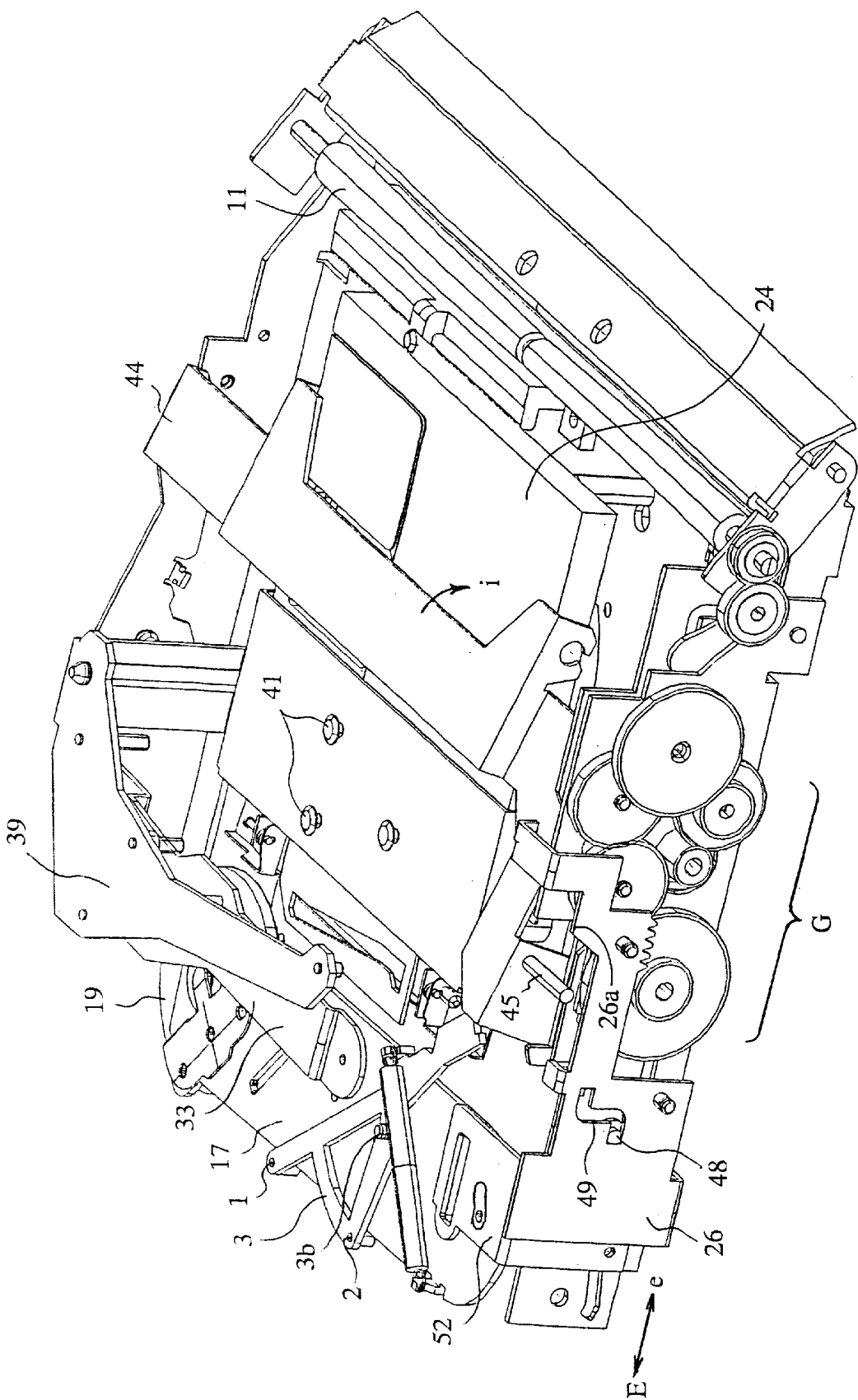
FIG. 13 is a three dimensional representation of the mechanism of a disk device in which an MD is played according to a first embodiment of the present invention.

FIG. 10 is a three dimensional representation of the mechanism of a disk device to which a member which functions when an MD is loaded has been added in a disk device according to a first embodiment of the present invention. Those components which are the same or similar as those in FIG. 1 are represented by the same reference numerals and their explanation is omitted. In the figure, 24 is an MD, 24*a* is a slide screen for exposing a disk stored in a cartridge, 25 is an MD holder, 36 is a elongated hole which is formed on the MD holder 25, 39 is a holder drawing lever, 34 is a shaft about which the holder drawing lever 39 rotates, 35 is a pin which engages with the elongated hole 36 and is provided in proximity to the tip of the holder drawing lever 39. 37 is a pin which engages with the elongated hole 38 and which is formed in proximity to the middle of the holder drawing lever 39. 44 is an MD holding and supporting member, 63 is a bearing for rotatable support of the holding and guiding member 61 (FIG. 11) of the MD holder 25. 41 is a guiding pin provided on the MD holder 25. 45 is a pin provided on the side face of the MD holder support member 44. The pin 45 is formed so that the MD holder supporting member 44 is held horizontal by the pin 45 riding on the horizontal face 46*b* of the upper section of the cam face 46 of the second sliding plate 6. When the pin 45 slides downwardly on the cam face 46 of the second sliding face 6 and separates from the cam face 46, the MD holder supporting member 44 incline the MD insertion side downwardly as shown in FIG. 13.

101 and 102 are CD guides which guide a CD from its upper surface and are disposed on both sides of the MD holder 25 and above the conveying roller 11. When a CD is inserted, the inserted CD is conveyed into the device by the conveying roller 11 as its upper face is guided by the CD guide 101, 102.

Figure 11:
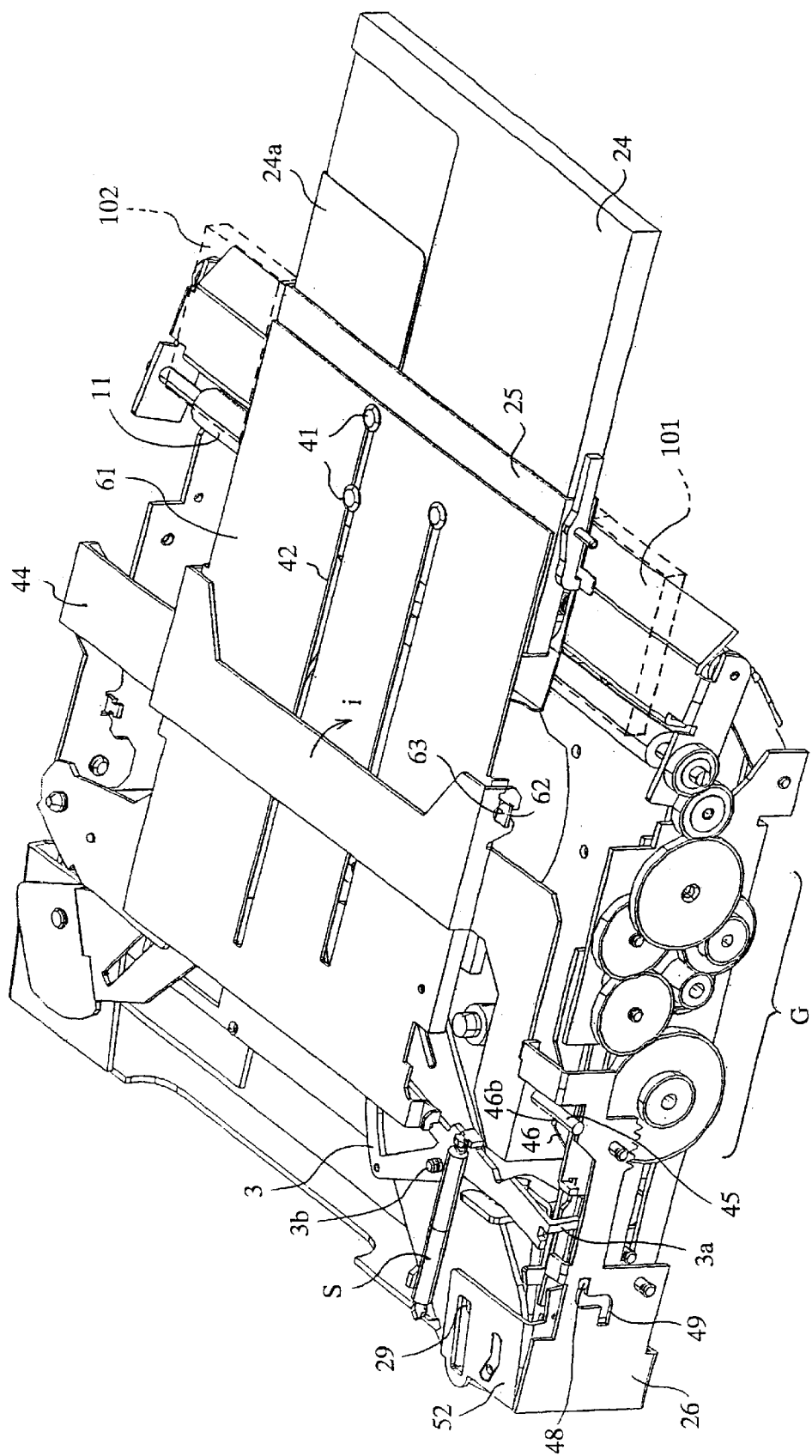
FIG. 11 is a three dimensional representation of the mechanism of a disk device to which a holding and guiding member has been added in a disk device according to a first embodiment of the present invention.

FIG. 11 is a three dimensional representation of the mechanism of a disk device to which a holding and guiding member has been added in a disk device according to a first embodiment of the present invention. In FIG. 11, those components which are the same or similar as those in FIG. 10 are denoted by the same reference numerals and their explanation will be omitted. In the figure, 42 is a guide hole which is formed on the holding and guiding member 61, which engages with the guide pin 41 and which guides the MD holder 25. 62 is a plate shaped axial body which projects on both sides of the holding and guiding member 61 and which engages with the bearing 63 which is formed on the MD holder supporting member 44.

Figure 12:
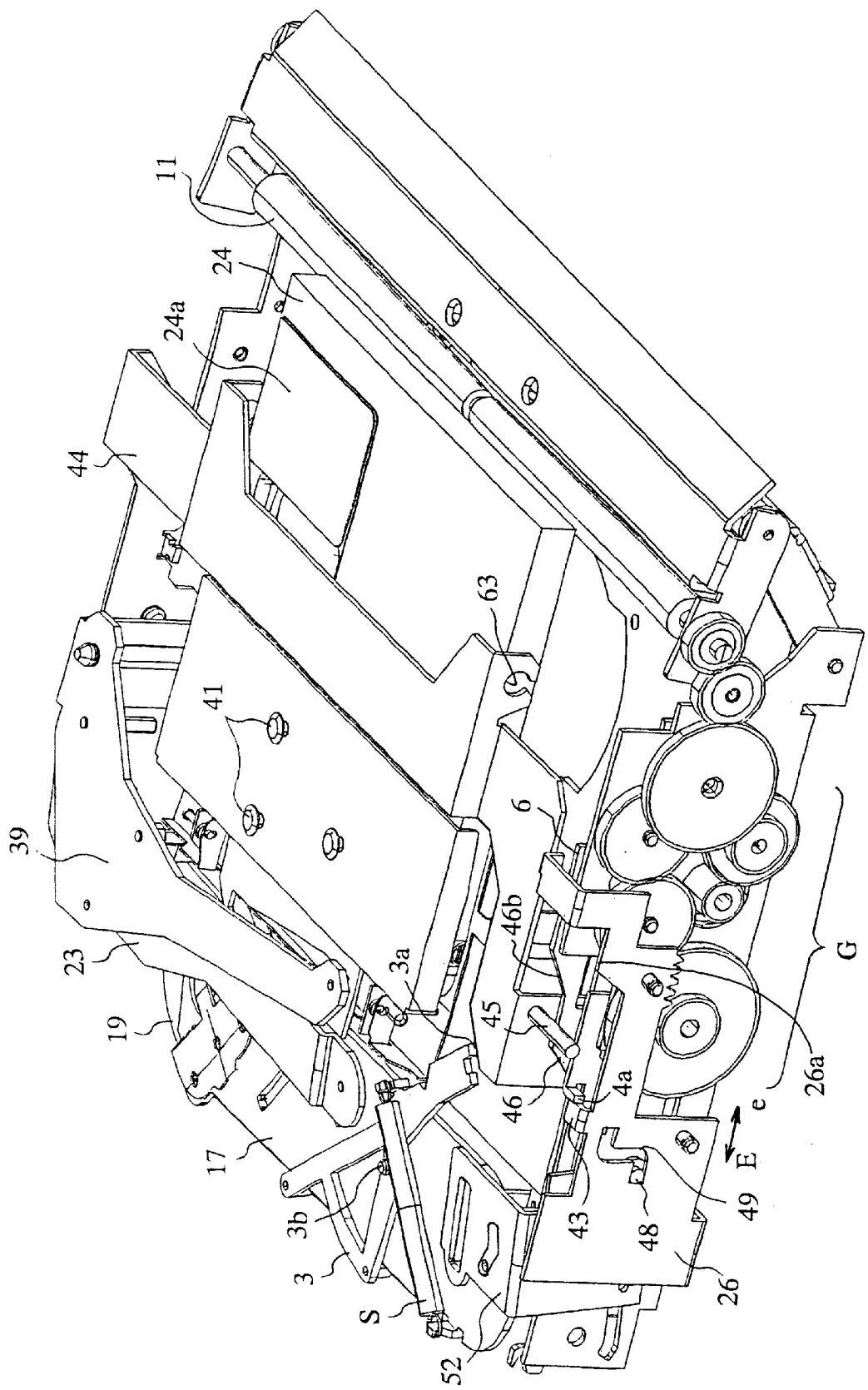
FIG. 12 is a three dimensional representation of the mechanism of a disk device in which an MD is conveyed by a conveying roller according to a first embodiment of the present invention.

FIG. 12 is a three dimensional representation of the mechanism of a disk device in which an MD is conveyed by a conveying roller according to a first embodiment of the present invention.

FIG. 13 is a three dimensional representation of the mechanism of a disk device when an MD is played according to a first embodiment of the present invention.

Figure 14:
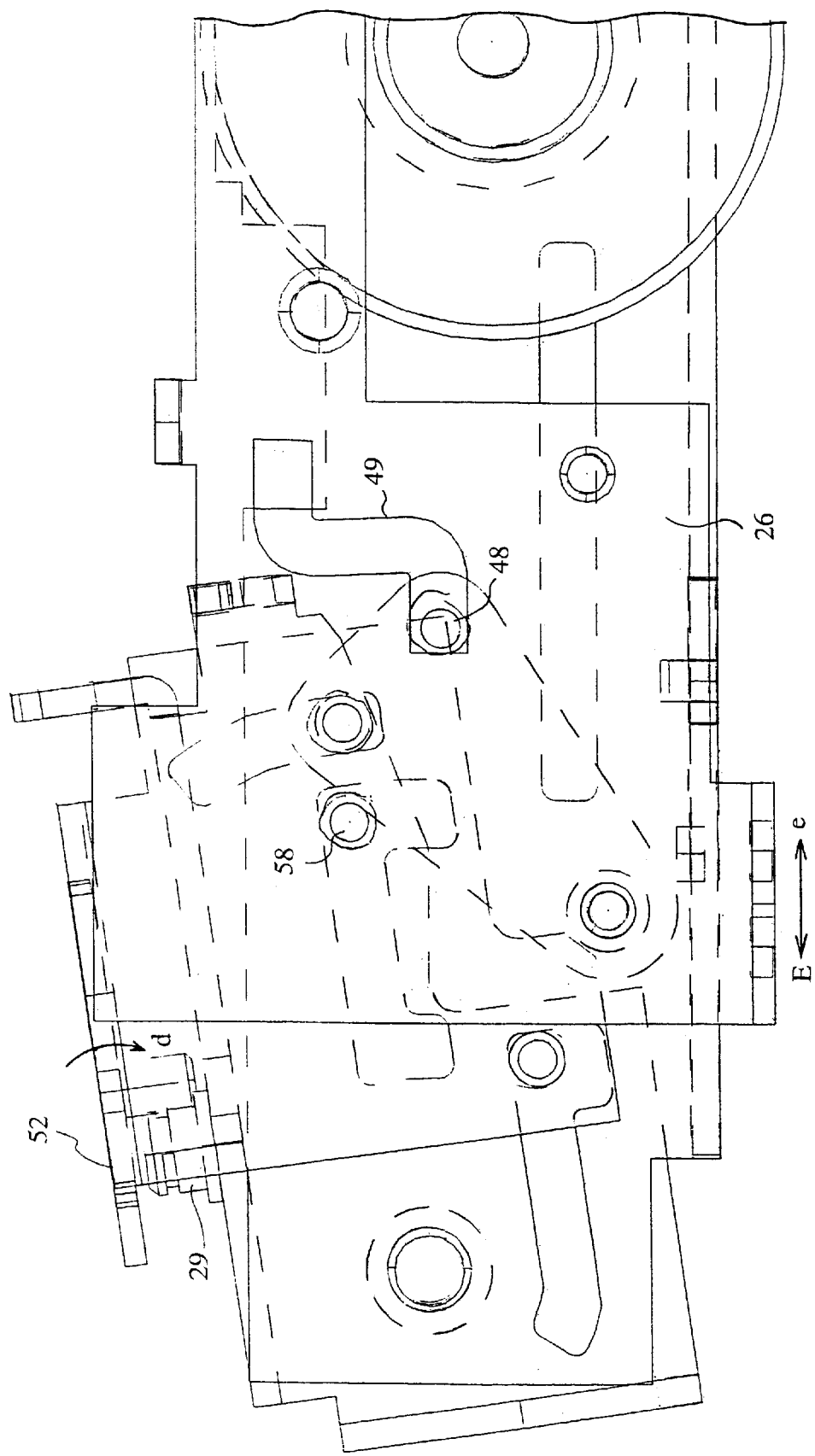
FIG. 14 is a partial lateral view of a disk device wherein the third sliding plate is displacing in the direction e of the arrow according to a first embodiment of the present invention.
Figure 15:
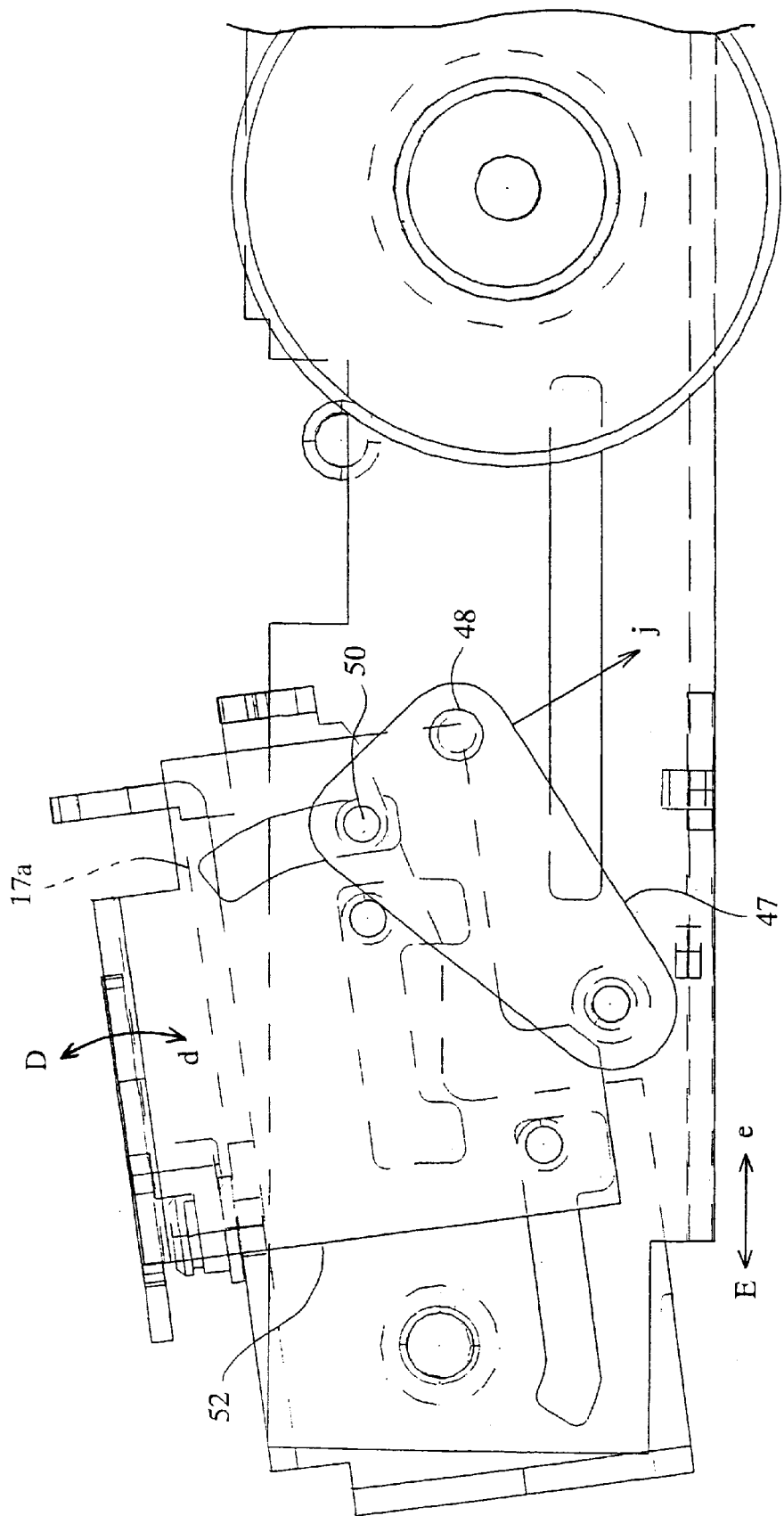
FIG. 15 is a partial lateral view of a disk device wherein the intermediate member is displaced in the direction e of the arrow by a third sliding plate (not shown) according to a first embodiment of the present invention.

FIG. 14 is a partial lateral view of a disk device wherein the third sliding plate 26 is displacing in the direction e of the arrow according to a first embodiment of the present invention FIG. 15 is a partial lateral view of a disk device wherein the intermediate member 52 is displaced in the direction e of the arrow by a third sliding plate 26 (not shown) according to a first embodiment of the present invention.

Figure 16:
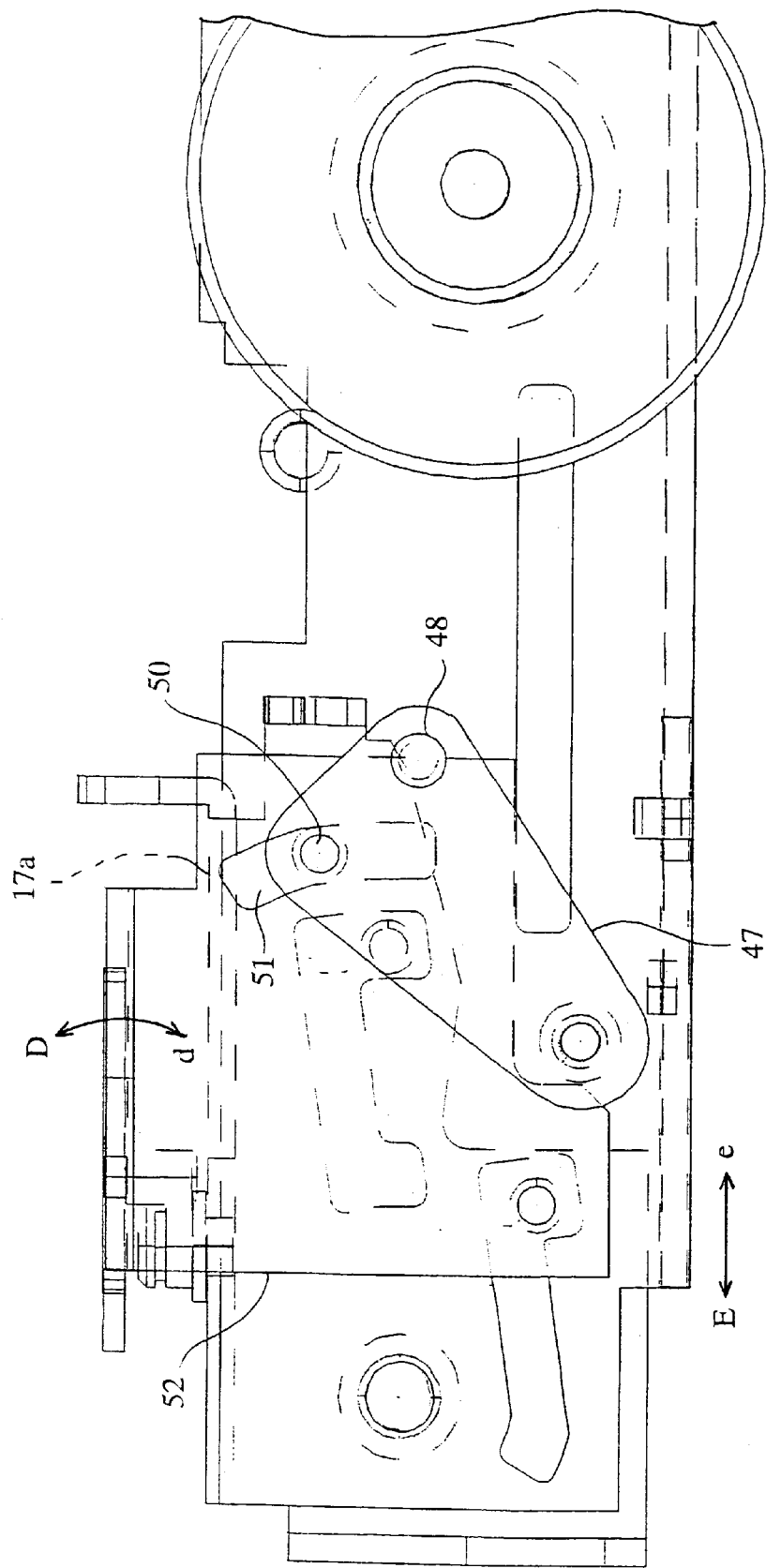
FIG. 16 is a partial lateral view of a disk device wherein an intermediate member is rotated in a direction d of the arrow according to a first embodiment of the present invention.

FIG. 16 is a partial lateral view of a disk device wherein an intermediate member 52 is rotated in a direction d of the arrow according to a first embodiment of the present invention.

Figure 17:
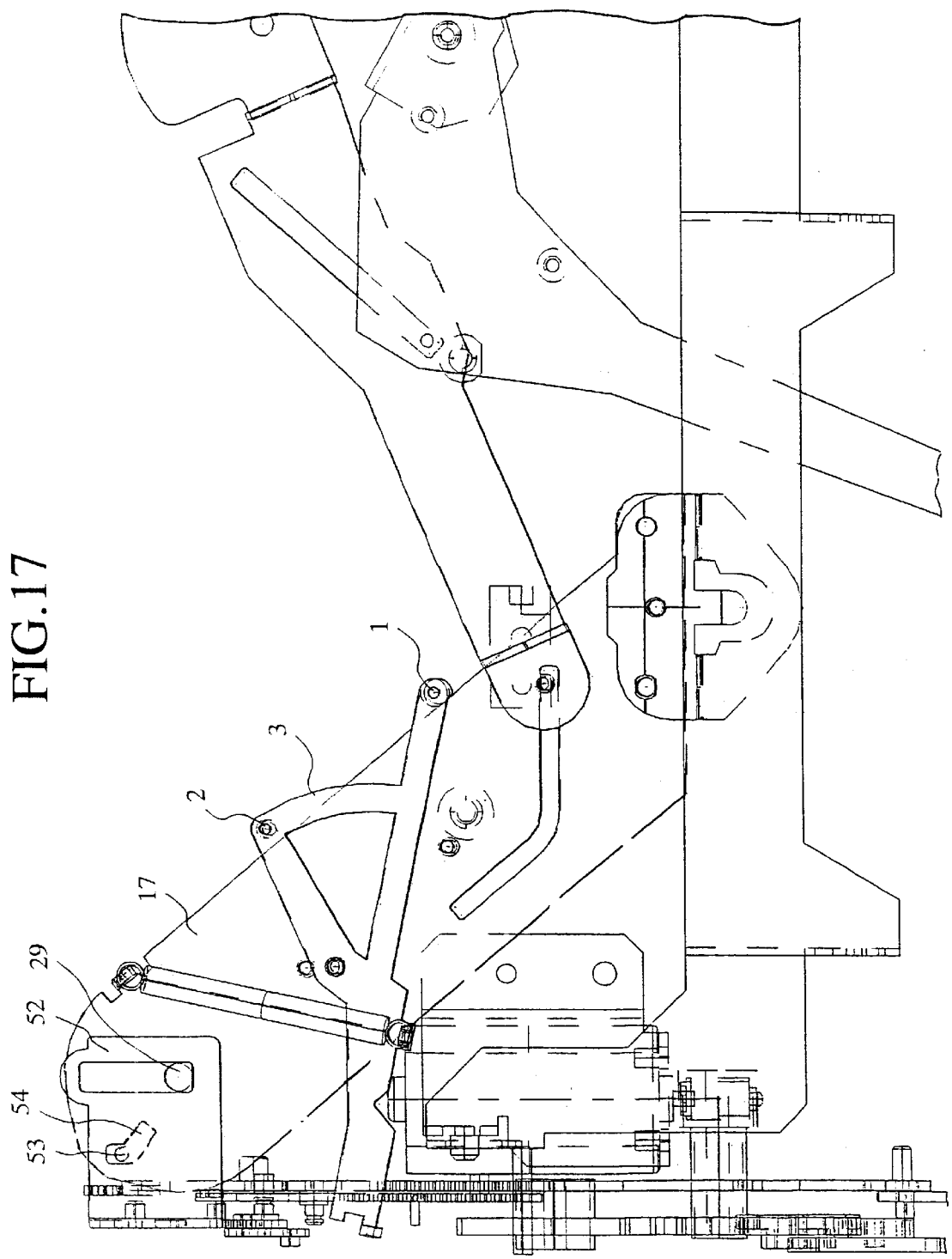
FIG. 17 is a partial front view of a disk device showing the mechanism by which the clamp lever is rotated in the rear direction when an MD is loaded according to a first embodiment of the present invention.

FIG. 17 is a partial front view of a disk device showing the mechanism by which the clamp lever 17 is rotated in the rear direction when an MD is loaded according to a first embodiment of the present invention.

Figure 18:
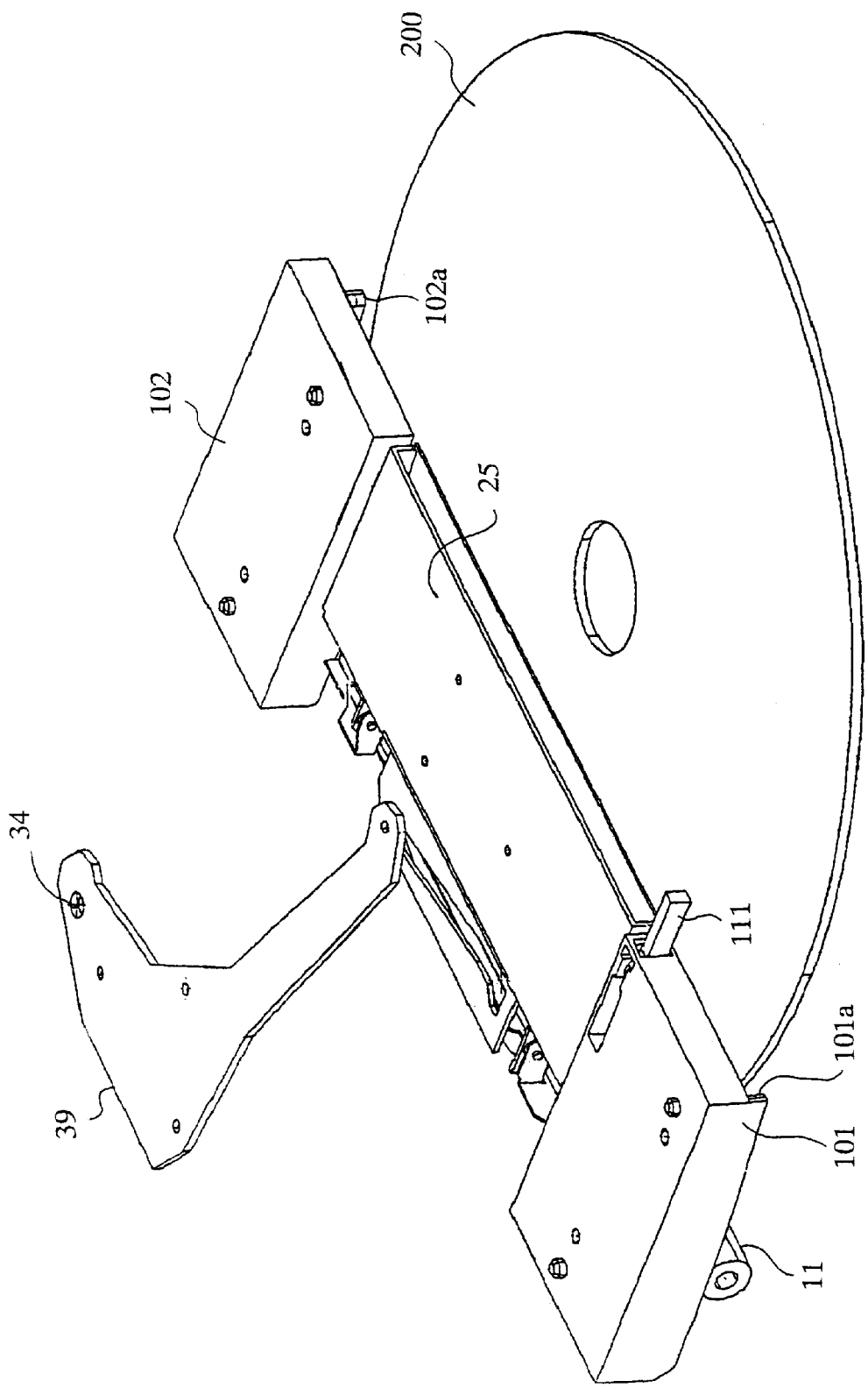
FIG. 18 is a three dimensional representation of the CD/MD insertion section when a CD is inserted according to a first embodiment of the present invention.

FIG. 18 is a three dimensional representation of the CD/MD insertion section when a CD 200 is inserted according to a first embodiment of the present invention. In the figure, 111 is an enlarging lever which enlarges the aperture of the MD holder 25 when an MD is inserted.

Figure 19:
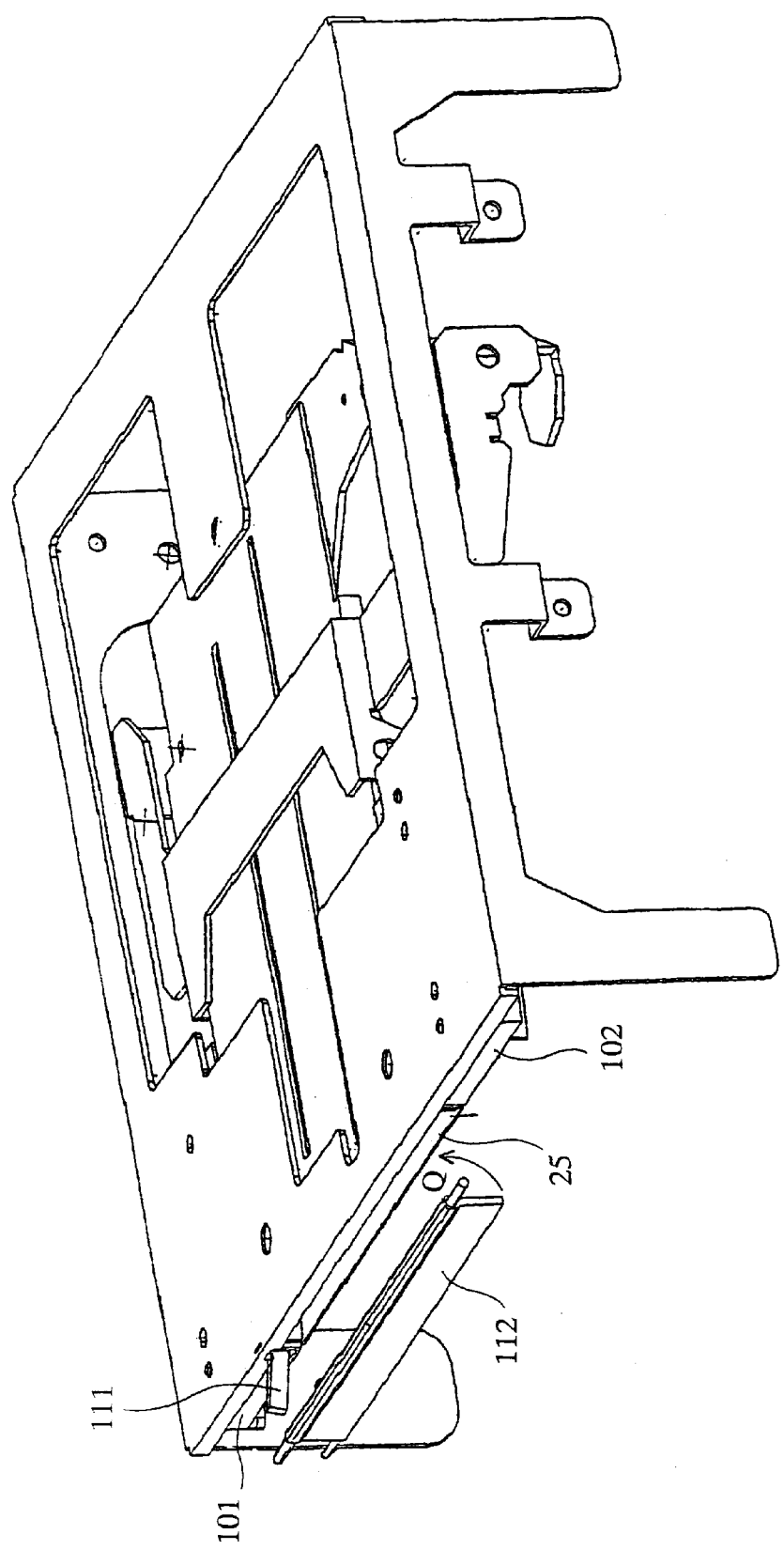
FIG. 19 is a three dimensional representation of the CD/MD insertion section according to a first embodiment of the present invention.

FIG. 19 is a three dimensional representation of the CD/MD insertion section according to a first embodiment of the present invention. In the figure, 112 is an MD insertion mouth screen which covers the MD insertion mouth of the MD/CD insertion section in order to prevent the entry of dust or the like. The MD insertion mouth screen 112 is adapted to rotate in the direction Q on abutting with an MD inserted from the MD insertion mouth. The MD insertion mouth screen 112 abuts with the side of the tip of an inserted MD when an MD is inserted from the CD/MD insertion section. However it is adapted not to abut with an inserted CD.

Figure 20:
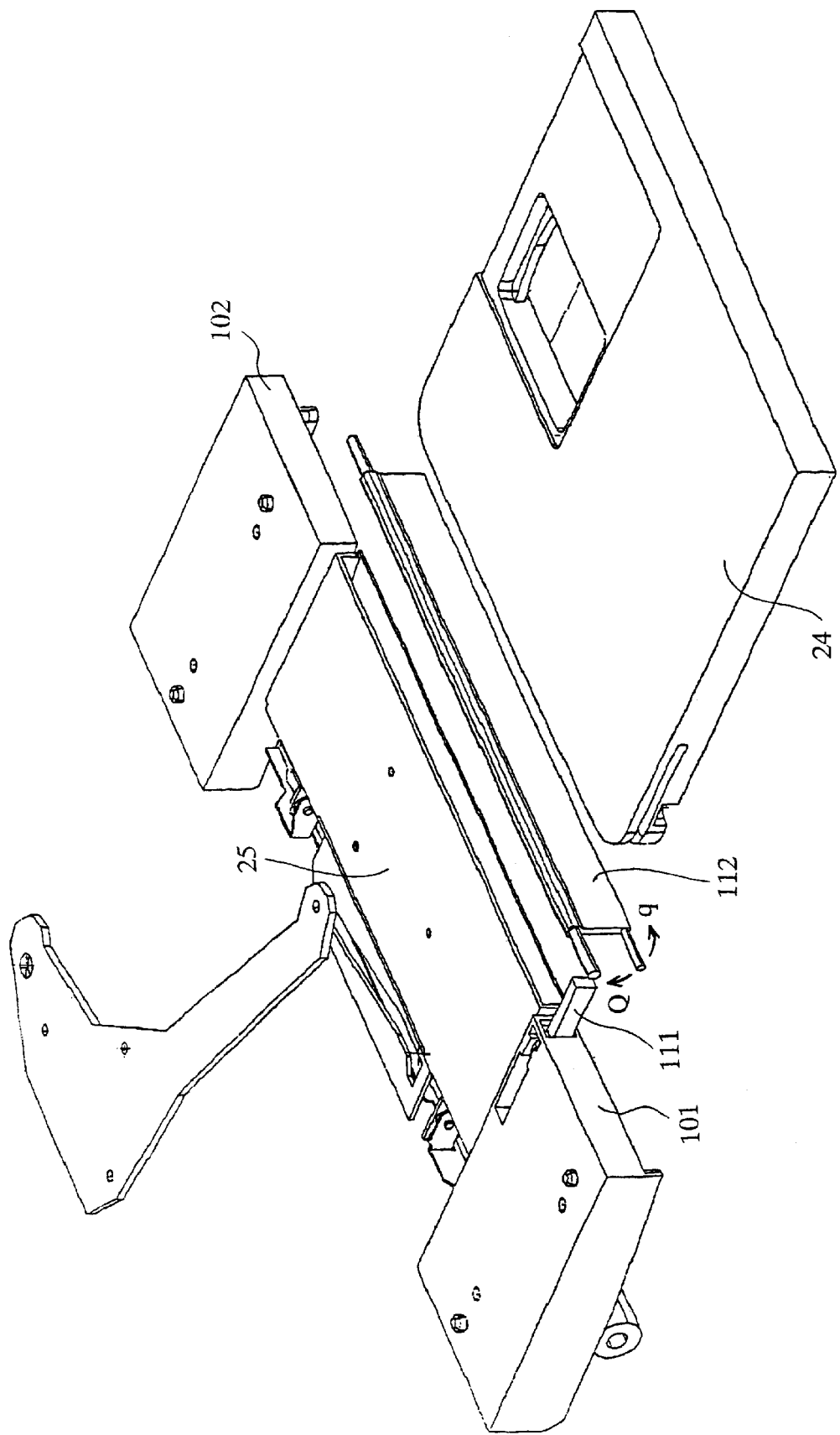
FIG. 20 is a three dimensional representation of an MD being inserted into the insertion mouth of a disk device according to a first embodiment of the present invention.

FIG. 20 is a three dimensional representation of an MD 24 being inserted into an MD insertion mouth of a disk device.

Figure 21:
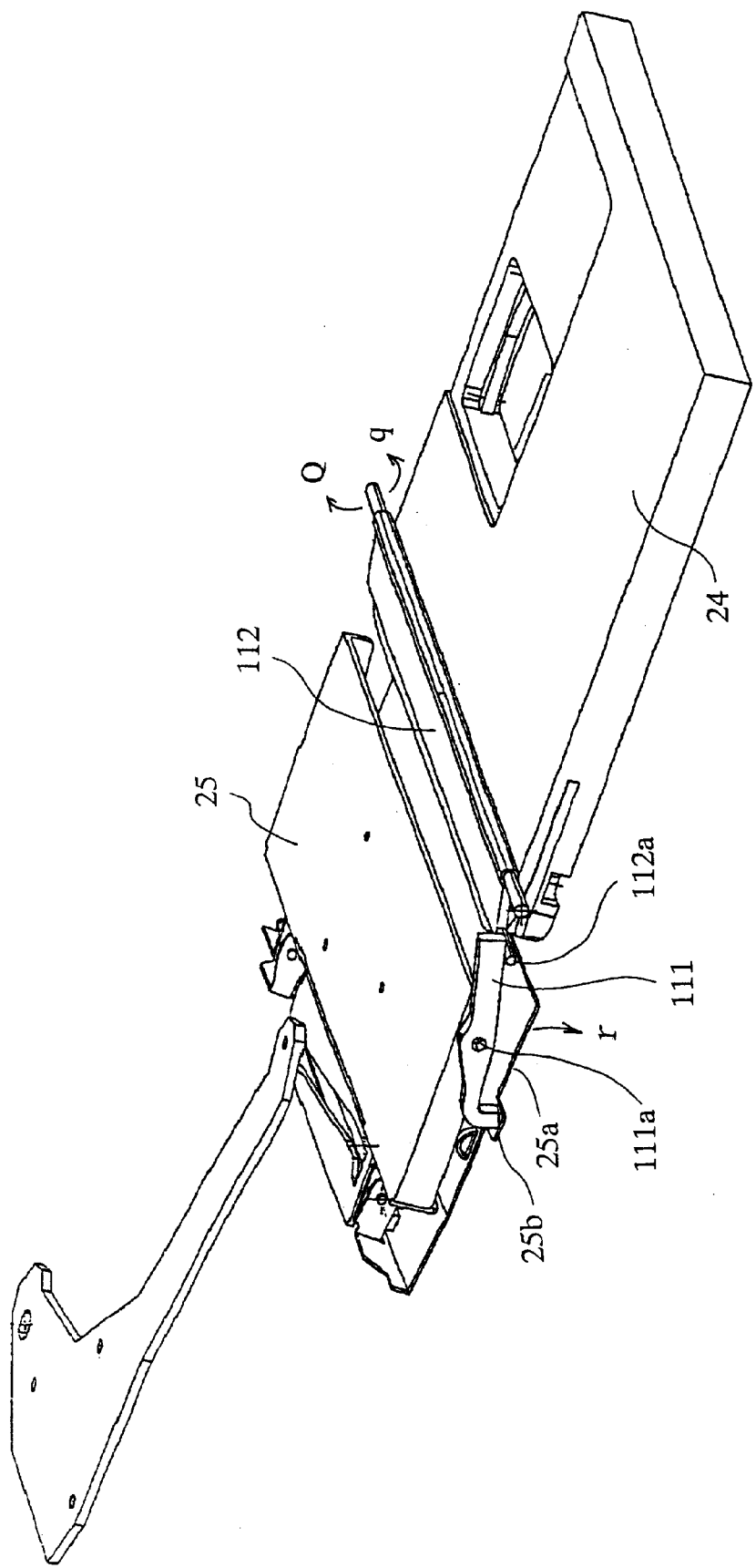
FIG. 21 is a three dimensional representation of the aperture of an MD holder as enlarged in a disk device according to a first embodiment of the present invention.

FIG. 21 is a three dimensional representation of the aperture of an MD holder 25 enlarged by the MD insertion mouth screen 112 rotating in direction Q by abutting with an MD inserted into the MD insertion mouth in a disk device according to a first embodiment of the present invention. As shown in the figure, a pin 112*a* is provided on one side face of the MD insertion mouth screen 112. The MD insertion mouth screen 112 of the MD insertion mouth abuts with the side of the tip of the MD 24 inserted into the MD insertion mouth. As a result, the enlarging lever 111 is rotated about the shaft 111*a* by the pin 112*a* of the MD insertion mouth screen 112, which is rotated in direction Q, raising an end of the enlarging lever III upwardly. The other end of the enlarging lever III abuts with the projection 25*b* of the MD holder aperture member 25*a* which is disposed on the lower side of the MD holder 25 which forms the aperture of the MD holder 25. The MD holder aperture member 25*a* opens in direction r and enlarges the aperture of the MD holder 25. Thus the insertion of an MD into the aperture of the MD holder 25 is facilitated.

Figure 22:
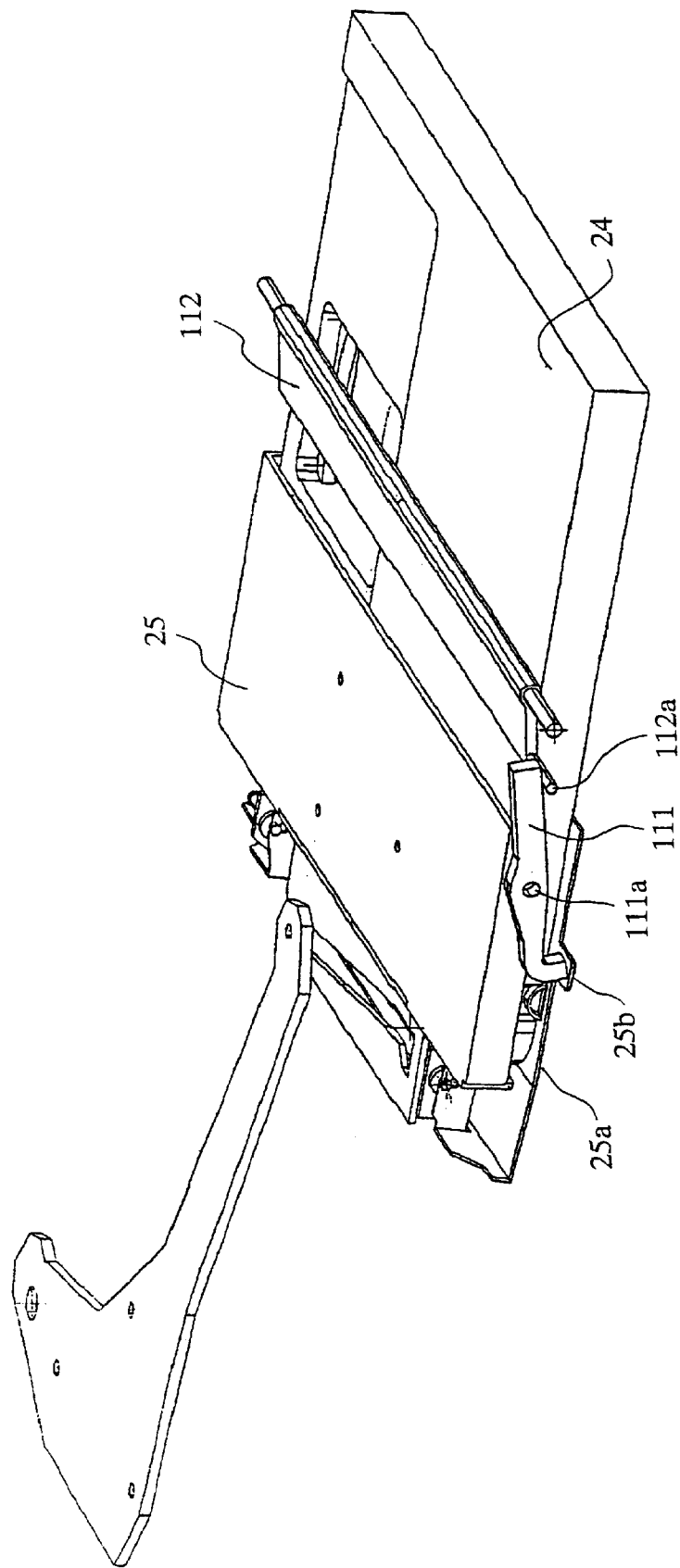
FIG. 22 is a three dimensional representation of an MD inserted into tile aperture of an enlarged aperture of an MD holder in a disk device according to a first embodiment of the present invention.
Figure 23:
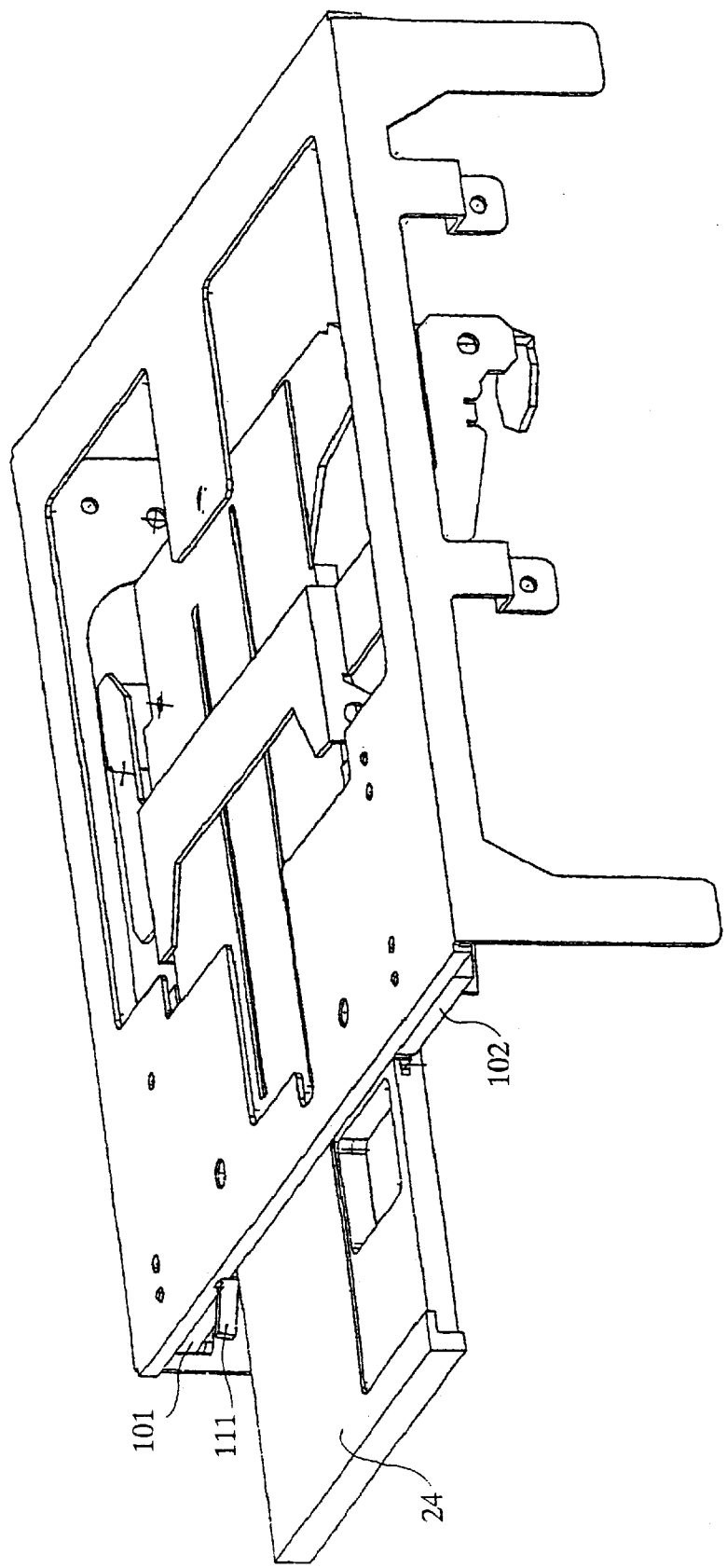
FIG. 23 is a three dimensional representation of an MD inserted into the aperture of an enlarged MD holder in a disk device according to a first embodiment of the present invention.

FIG. 22 and FIG. 23 are three-dimensional representations of an MD 24 inserted into the aperture of an MD holder 25 enlarged in the above manner in a disk device.

From the discussion above, the term "CD conveying mechanism" used in the claims corresponds to the gear unit G, the conveying roller 11 and the like, the term "clamp mechanism" refers to the damper 1, 2, 3, 3a, 4, 6, 15, 17, 17a 19, the term "clamp lever rotation mechanism" corresponds to the third sliding plate 26, the relay member 4, the intermediate member 52, the pin 53, the slit 54 and the like, the term "MD conveying mechanism" corresponds to the MD holder 25, sink lever 33, the holder drawing lever 39, the guide pin 41, the guide hole 42, the holding and guiding member 61 and the like, the term "MD placing mechanism" refers to the cam face 46 of the second sliding plate 6, the pin 45 and the like.

The operation of the invention will be discussed below.

(CD Loading Operation)

When a CD is inserted into the disk device, a sensor (not shown) detects the fact that a CD has been inserted. As a result, a drive motor (not shown) is operated and a gear unit G is driven. The conveying roller 11 is rotated in the direction aa shown in FIG. 7.

As a result, the inserted CD is conveyed further into the device by the conveying roller 11.

In this state, when the inserted CD is a small diameter disk, the outer circumference of the small diameter disk abuts with the small diameter disk abutting pin 1. When the inserted CD is a large diameter disk, the outer circumference of the large diameter disk abuts with the large diameter disk abutting pin 2.

The CD is inserted further into the device by the conveying roller 11 in a state in which the outer circumference of the CD has abutted with a small diameter disk abutting pin 1 or large diameter disk abutting pin 2. Thus the center of the CD 200 arrives at the center of the turntable. As a result, as shown in FIG. 6, the lever 3 rotates in direction a about the supporting point 3b due to the inserted CD 200.

When the lever 3 rotates in direction a, the engagement piece 3a displaces in direction b and abuts with the engagement piece 4a of the first sliding plate 4 and thus further slides the first sliding plate 4 in the direction e of the arrow.

As a result, as shown in FIG. 2, the rack 8 formed on the first sliding plate 4 engages with the gear 9, and the first sliding plate 4 further slides in direction e due to the gear 9 which is rotating to the left.

When the first sliding plate 4 slides in direction e, the pin 5 which is formed on the first sliding plate 4 abuts with the end of the slit 7 near the conveying roller 11, which is formed on the second sliding plate 6 and the second sliding plate 6 slides in direction e.

As a result, the rack 10 which is formed on the second sliding plate 6 also engages with the gear 9 and the gear 9 slides the first and second sliding plates 4, 6 in the direction e of the arrow.

When the second sliding plate 6 slides in direction e, the pin 14 which is engaged with the S-shaped elongated hole 55 formed on the second sliding plate 6 and which is formed on the extension 13a of the lifting arm 13 as shown in FIG. 7 slides to the upper end of the S-shaped elongated hole 55 as shown in FIG. 8. As a result, the lifting arm 13 shown in FIG. 7 rotates about the shaft 13b in the other direction C, rotates the conveying roller supporting lever 12 in direction Y and depresses the conveying roller 11 as shown in FIG. 8.

Since the pin 15 which is formed on the second sliding plate 6 displaces in the direction e due to the second sliding plate 6 sliding in the direction e, the pin 15 which is abutting with the cam face 16, which is formed on the clamp lever supporting member 17a as shown in FIG. 2. slides on the cam face 16 and tile pin 5 is separated from the cam face 16 as shown in FIG. 8.

As a result, the clamp lever supporting member 17a, the intermediate member 52 and the clamp lever 17 rotate in the direction D as shown in FIG. 6. The clamp 19 which is formed on the tip of the clamp lever 17 as shown in FIG. 9 clamps the CD 200 on the turntable from above.

(CD Ejection Operation)

During CD ejection operation, the drive motor rotates in the opposite direction to that during CD loading operation. As a result, the gear 9 rotates to the right as shown in FIG. 8 and the first and second sliding plates 4, 6 slide in the direction E.

When the second sliding plate 6 slides in direction E, the pin 15 which is formed on the second sliding plate 6 abuts with the cam face 16 of the clamp lever supporting member 17a which is rotated about the rotation shaft 18 in the direction D. Thus as shown in FIG. 2, the gripping of the CD 200 by the clamp 19 and the turntable is released and the relationship of the clamp 17 and the CD 200 is thereafter as shown in FIG. 6.

The pin 14 which engages with the S-shaped elongated hole 55 displaces to the lower end of the S-shaped elongated hole 55 by sliding in the S-shaped elongated hole 55 from the position shown in FIG. 8 due to the displacement of the second sliding plate 6 in direction E. As a result, the lifting arm 13 rotates in the direction c shown in FIG. 7, the conveying roller 11 is raised and abuts with the rear face of the CD 200. Thus the conveying roller support lever 12 and the conveying roller 11 are the position as shown in FIG. 2.

At this time the CD 200 is ejected from the device by the rotating conveying roller 11 since the gear unit G is rotated in direction AA shown in FIG. 7 by the drive motor.

When rack 8 of the first sliding plate 4 and the rack 10 of the second sliding plate 6 are separated from the gear 9, the first and second sliding plates 4 and 6 are displaced even further in direction E by a spring (not shown) and return to an initial position as shown in FIG. 2.

The action of ejecting a CD as explained above is the same for both small and large disks. Since the possibility exists for the raised conveying roller 11, when raised, of coming into contact with the edge of a small diameter disk, the lever 22 is rotated in direction M about the shaft 23 by the action of the pin 21 provided on the second sliding plate 6 on the cam face 22a due to the second sliding plate 6 displacing in direction E. Thus the conveying roller 11 is prevented from contacting with the edge of the small diameter disks as the peripheral section of the small diameter disk on the conveying roller abutting side is raised upwardly.

(MD Loading Operation)

When an MD 24 is inserted into the MD insertion mouth in the CD/MD insertion section, as shown in FIG. 21, the side of the tip of the inserted MD 24 abuts with the MD insertion mouth screen 112. As a result, the MD insertion mouth screen 112 rotates in direction Q and raises an end of the enlarging lever 111 upwards. The other end of the enlarging lever 111 is rotated about the shaft 111a and pushes the projection 25b downwards. Therefore the MD holder aperture member 25a is opened in the direction r as a result and the aperture of the MD holder 25 widens. In this position, when the MD 24 is further pushed, the MD 24 becomes inserted into the MD holder 25 as shown in FIG. 10.

When an MD 24 is inserted into the MD holder 25, the insertion is detected by a sensor (not shown). A drive motor (not shown) is activated to drive a gear unit G. As a result, the third sliding plate 26 is displaced in the direction e shown in FIG. 14 by a member (not shown). A rack 27 formed on the third sliding plate 26 engages with the gear 28 and thereafter the third sliding plate 26 displaces in the direction e due to the rotations of the gear 28. The pin 48 of the relay member 47 engages with the S-shaped elongated hole 49 and rotates in direction j as shown by FIG. 15. An intermediate member 52 which has an arc-shaped elongated hole 51 with which the pin 50 of the relay member 47 has engaged displaces in the same direction as the third sliding plate 26.

The engaging piece 43 of the third sliding plate 26 shown in FIG. 10 pushes the engaging piece 4a of the first sliding plate 4 as the third sliding plate 26 displaces in the direction e. Thus the first sliding plate 4 is displaced in direction e. As a result, the movement of the first and second sliding plates 4 and 6 is the same as the action explained above when loading a CD.

On the other hand, together with displacement of the intermediate member 52, the pin 53 formed on the intermediate member 52 as shown in FIG. 17 abuts with an end of the slit 54 of the clamp lever 17. The clamp lever 17 rotates in direction f about the rotation shaft 29 and displaces to a rear position which will not impede the loading of the MD 24. The link level 33 displaces in direction g about the shaft 30 due to the rear displacement of the clamp lever 17. As a result, the holder drawing lever 39 rotates in the direction h about the shaft 34. Thus the MD holder 25, on which the elongated hole 36 which engages with the pin 35 of the tip of the holder drawing lever 39 is formed, is drawn into the device as shown in FIG. 12.

The MD holder 25 is drawn into the device without any positional divergence by the guide hole 42 and the guide pin 41 as shown in FIG. 11.

The MD 24 opens the sliding screen 24a by a member (not shown) to the degree to which it is drawn into the device and is drawn to a fixed position in the device.

The pin 45 which is provided on the lateral face of the MD holder supporting member 44 slides downwardly on the cam face 46 which is formed on the second sliding plate 6 due to the displacement of the second sliding plate in direction e. As a result, the MD holder supporting member 44 inclines towards the MD insertion side in direction i as shown in FIG. 13. Thus the MD 24 is placed on the turntable.

The downward rotation of the MD holder supporting member 44 is limited as the third sliding plate 26 does not move in direction e or the arrow and the cam section 26a and pin 45 abut.

The plate shaped shaft 62 which projects to both lateral sides of the holding and guiding member 61 rotatably engages with the bearing 63 formed on the MD holder support member 44 as shown in FIG. 11. Thus even if the MD holder support member 44 inclines in direction i, the holding and guiding member 61 can attain a horizontal state. In this way, an MD 24 which is gripped by the MD holder 25 can be place horizontally on the turntable.

When the MD 24 as shown in FIG. 13 is placed on the turntable, the conveying roller 11 is depressed in the same way as explained when a CD is stored.

(MD Ejection Operation)

When an MD 24 which has been placed on a turntable is ejected outside the device, a drive motor (not shown) rotates in the opposite direction to that when an MD is loaded. As a result, the first and second sliding plates 4 and 6 displace in direction E and their orientation changes from that shown in FIG. 13 to that shown in FIG. 12. The third sliding plate 26 is displaced in direction E and the MD 24 is gripped by the MD holder 25 as shown in FIG. 11. Thus the MD can be ejected to the outside of the device from the MD insertion mouth in the CD/MD insertion section as the MD insertion aperture screen 112 opens in direction q as shown in FIG. 20.

As shown above, according to embodiment 1, a disk device is obtained which can convey MDs which are cartridge stored disks, small and large diameter disks and load and eject such types of disks onto and from a turntable with high reliability by using a single drive motor.

Furthermore, according to embodiment 1, since CD guides 101, 102 are disposed on both sides of the MD holder 25, it is possible to reduce the width of the device.

Furthermore, according to embodiment 1, since the aperture of the MD holder 25 is enlarged when an MD is inserted from an MD insertion mouth, it is simple to load an MD into the MD holder 25 and thus user-friendliness is enhanced.

As shown above, the disk device of the present invention is adapted for use in a vehicle with either disks of different shapes or cartridge stored disks.

What is claimed is:

1. A disk device which conveys circular disks of different sizes and cartridge-stored disks used in cartridge-stored form, loads said disks onto a turntable and ejects said disks from said turntable, said disk device comprising:

a single drive motor which is driven by insertion of said circular disk or said cartridge-stored disk;

a first type disk conveying mechanism having a conveying roller which performs uptake and ejection of the circular disk by a drive force of the drive motor;

a clamp mechanism which clamps said circular disk by a clamp lever which is operated from an initial position to said turntable together with uptake of said circular disk to a fixed position by the conveying roller of the first type disk conveying mechanism;

a clamp lever rotation mechanism which is driven by said drive motor when the cartridge-stored disk is inserted and displaced to a position which does not impede the uptake or ejection of the cartridge-stored disk, said clamp lever rotation mechanism rotating said clamp lever back to an initial position during ejection of the cartridge-stored disk;

an second type disk conveying mechanism connected to said clamp lever by a link mechanism, for performing the uptake of the cartridge-stored disk together with refuge of the clamp lever away from the turntable and for performing the ejection of said cartridge-stored disk together with return of said clamp lever to an initial position; and an second type disk placing mechanism which places the cartridge-stored disk on said turntable together with the uptake of said cartridge-stored disk to a fixed position by said second type disk conveying mechanism.

2. A disk device according to claim 1, further comprising a cam section which limits action of said second type disk placing mechanism by said clamp lever rotation mechanism when said first type disk clamp is operating.

* * * * *